(12) United States Patent
de Barros

(10) Patent No.: US 7,747,300 B1
(45) Date of Patent: Jun. 29, 2010

(54) VARIABLE PRICING BASED ON SYSTEM LOAD

(75) Inventor: Marcus S. de Barros, Solana Beach, CA (US)

(73) Assignee: Intuit Inc., Mountain View, CA (US)

( * ) Notice: Subject to any disclaimer, the term of this patent is extended or adjusted under 35 U.S.C. 154(b) by 944 days.

(21) Appl. No.: 11/395,649

(22) Filed: Mar. 30, 2006

(51) Int. Cl.
   *H04B 1/10* (2006.01)
(52) U.S. Cl. .................................. 455/703; 705/31
(58) Field of Classification Search ............ 700/100, 700/12, 101, 121; 705/1, 4, 26, 31, 35, 412; 709/217; 364/401, 405, 406, 409
   See application file for complete search history.

(56) References Cited

U.S. PATENT DOCUMENTS

| 6,202,052 B1 * | 3/2001 | Miller | 705/31 |
| 2004/0083112 A1 * | 4/2004 | Horst | 705/1 |
| 2007/0203723 A1 * | 8/2007 | Segura et al. | 705/1 |

OTHER PUBLICATIONS

Jeffrey S. Chase, Darrell C. Anderson, Prachi N. Thakar, Amin M. Vahdat, and Ronald P. Doyle. 2001. Managing energy and server resources in hosting centers. In Proceedings of the eighteenth ACM symposium on Operating systems principles (SOSP '01). ACM, New York, NY, USA, 103-116. DOI=10.1145/502034.502045. http://doi.acm.org/10.1145/502034.502045.*

* cited by examiner

*Primary Examiner*—Matthew S Gart
*Assistant Examiner*—Mohammad R Ullah Masud
(74) *Attorney, Agent, or Firm*—Osha • Liang LLP

(57) ABSTRACT

An apparatus for applying a variable pricing model for a service includes a user device configured to send a request for the service, a processing server within a resource infrastructure, wherein the processing server is configured to receive the request from the user device, and a resource management module associated with the resource infrastructure and the processing server. The resource management module is configured to detect current system utilization of the resource infrastructure connected to the user device, calculate a current price of the service based on current system utilization, and forward the current price to the user device requesting the service.

17 Claims, 4 Drawing Sheets

VARIABLE PRICING BASED ON SYSTEM LOAD

BACKGROUND

Online electronic transactions between users and service providers are common today because of the widespread usage of the Internet. A service provider for online electronic transactions typically scales up its data processing capability and network infrastructure to handle the increased load as the number of users grows. Some services experience fluctuation of usage resulting in cyclic peak and idle time periods during a given day, a given month, or a given year.

Such cyclic peak and idle time periods are not confined to the networking world. In fact, the problem is pervasive throughout the real world. For example, a highway gets congested during rush hours, while it is largely free of traffic at midnight. A department store has peak customer traffic during holiday seasons. The same store typically has low traffic on a weekday morning.

In case of the highway example, a car pool lane can be introduced to alleviate congestion during the rush hours by reducing the number of cars on the road. In case of the department store example, the store might scale up its customer handling capability by hiring temporary seasonal workers to accommodate the peak customer traffic during the holiday seasons.

An example of a typical cyclical Internet service is an online tax filing service. Network and data processing equipment experiences the highest traffic and load before a tax filing deadline, such as April $15^{th}$ in any given year. The online tax filing service provider invests a significant amount of capital in network and data processing infrastructure to satisfy this one peak demand near April 15th even though system utilization is much lower for the most part of the year.

SUMMARY

In general, one aspect, the invention relates to an apparatus for applying a variable pricing model for a service. The apparatus comprises a user device configured to send a request for the service, a processing server within a resource infrastructure, wherein the processing server is configured to receive the request from the user device, and a resource management module. The resource management module is associated with the resource infrastructure and the processing server, wherein the resource management module is configured to: detect current system utilization of the resource infrastructure connected to the user device, calculate a current price of the service based on current system utilization, and forward the current price to the user device requesting the service.

In general, one aspect, the invention relates to a method for applying a variable pricing model for a service. The method comprises receiving a request for the service from a user device, detecting current system utilization of a resource infrastructure connected to the user device, calculating a current price of the service based on the variable pricing model and the request, wherein the variable pricing model obtains the current price based on current system utilization, and forwarding the current price to the user device requesting the service.

In general, one aspect, the invention relates to an apparatus for applying a variable pricing model for an electronic tax filing service. The apparatus comprises a user device configured to send a request for the electronic tax filing service, a processing server within a resource infrastructure, wherein the processing server is configured to receive the request from the user device; and a resource management module associated with the resource infrastructure. The resource management module is configured to detect current system utilization of the resource infrastructure connected to the user device, calculate a current price of the tax filing service based on current system utilization, and forward the current price to the user device requesting the electronic tax filing service.

Other aspects of the invention will be apparent from the following description and the appended claims.

DETAILED DESCRIPTION

Figure 1:
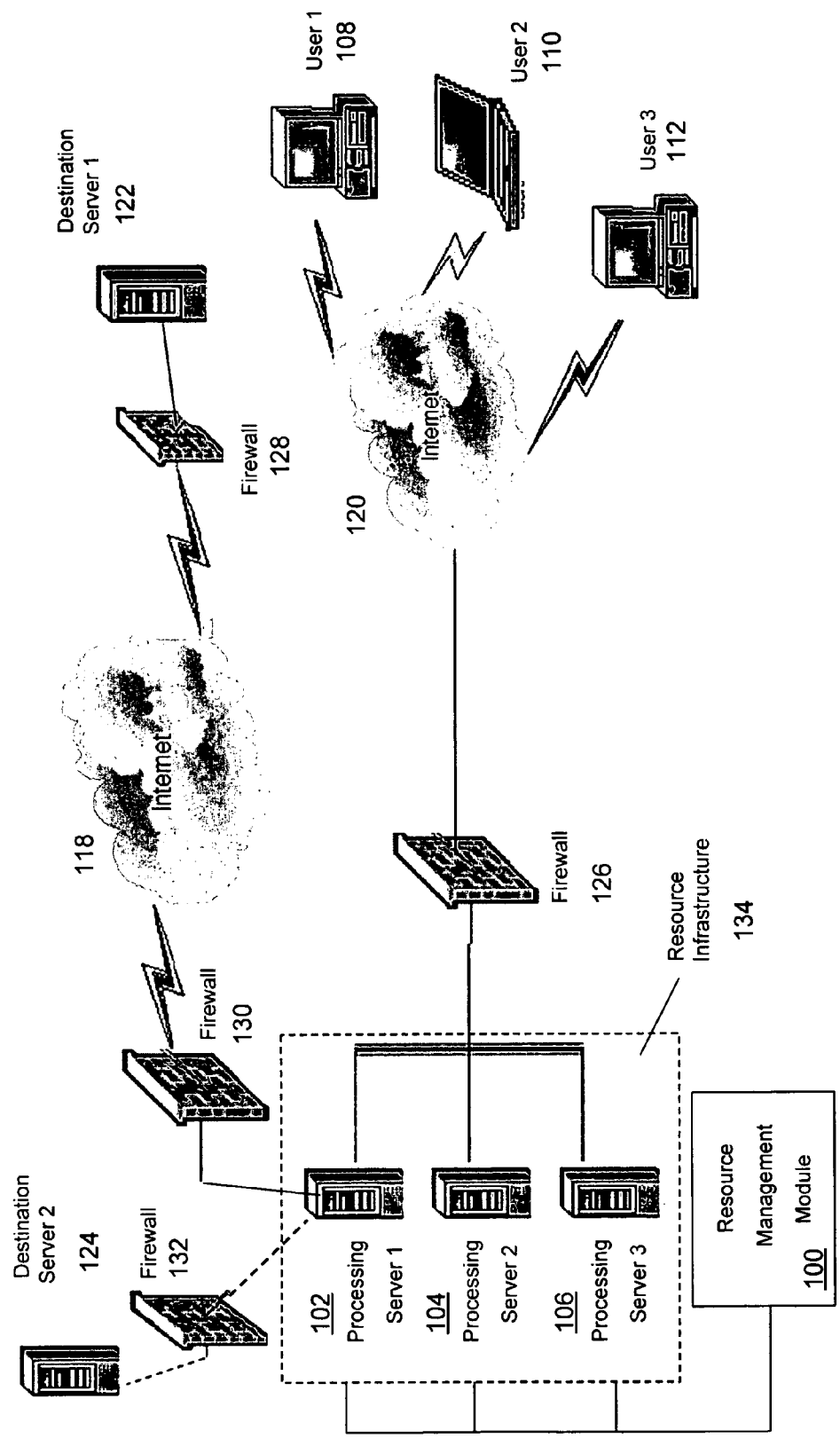
FIG. 1 shows a flow diagram of a network system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A variable pricing model based on system load can greatly reduce information technology (IT) infrastructure investment requirements for service providers or any industry affected by cyclic peak and idle time periods. For example, an online tax filing service provider, which experiences peak transaction volume during normal business hours as a tax filing deadline approaches requires an IT infrastructure that can support peak demand. Similarly, retail credit card providers experience increased usage during the holiday season that may stress the IT infrastructure and/or require infrastructure investment to address this cyclic peak period. If a variable pricing model is applied to the tax filing service provider or credit card provider based on the number of users attempting to access the system at the same time, the user demand can be distributed over both peak and non-peak time periods. In one or more embodiments of the invention, the variable pricing model involves adjusting the price of a service in relation to the demand on the system. For example, if the demand on the system is high, then the cost of the service increases to a point where the demand on the system is reduced. Accordingly, the variable pricing reduces the need for additional resources to continue providing the service at acceptable performance levels. Conversely, if the demand on the system is low, then the cost of the service may decrease; thereby encouraging users of the system to use the otherwise idle resources.

FIG. 1 shows a flow diagram of a network system in accordance with one or more embodiments of the invention. Multiple users (User 1 (108), User 2 (110), and User 3 (112)) access a resource infrastructure (134) of a provider (not shown) via the Internet (120) or other wide area network (WAN). Each of the users (User 1 (108), User 2 (110), and User 3 (112)) may be using one or more user devices, such as a laptop computer, a desktop computer, a personal digital assistants (PDAs), a cellular phone, or other similar devices that may be used to communicate data to the resource infrastructure (134). In one or more embodiments of the present invention, the multiple users (User 1 (108), User 2 (110), and User 3 (112)) send requests (e.g., current price request for service, estimated future price request for service, etc.) to the resource infrastructure (134) of a service provider. One skilled in the art will appreciate that the term service, as used herein, is not limited to providers of traditional online computing services. In fact, the term service may includes any service where a computer system as shown in FIG. 1 may be involved (no matter how limited or extensive the involvement may be), e.g., submission of tax filing, processing of credit card purchases, distribution of online services, submission of complex computing jobs, processing of medical claims, inventory control, or any other service involving the use of a computer system.

The resource infrastructure (134) includes one or more processing servers (Processing Server 1 (102), Processing Server 2 (104), and Processing Server 3 (106)), which typically remain protected behind a firewall (126). The processing servers (Processing Server 1 (102), Processing Server 2 (104), and Processing Server 3 (106)) are capable of forwarding the requests to a resource management module (100) and processing actual transactions for requested services if a user decides to purchase a service. The resource management module (100) is configured to detect current system utilization of the resource infrastructure (134), which receives streams of data and requests from the users (User 1 (108), User 2 (110), and User 3 (112)) at any given time.

In one or more embodiments of the present invention, one measure of the current system utilization is server CPU utilization. The CPU utilization may be monitored to determine how much of the server's total CPU capacity is being used (e.g., what percentage of server's CPU capacity is free (or used)). If the server CPU utilization exceeds a threshold value, the service provider (using an agreed upon variable pricing model) can quote a higher rate and provide alternative times with cheaper rates to encourage some users to execute transactions at a later time.

In one or more embodiments of the present invention, another measure of the current system utilization is network traffic load. The network traffic load may be monitored to determine how much of the network bandwidth is being used (e.g., what percentage of network's bandwidth capacity is free (or used)). If the network traffic load exceeds a threshold value, the service provider (using an agreed upon variable pricing model) can quote a higher rate and provide alternative times with cheaper rates to encourage some users to execute transactions at a later time.

One skilled in the art will appreciate that the current system utilization may be composed of only one measure (i.e., CPU utilization or network traffic load) or a combination of several measures, where one or more of the measures may be weighted according to a formula.

Continuing with FIG. 1, the resource management module (100) is configured to calculate a current price for the service based on a variable pricing model, which considers the current system utilization (measured using such measures as CPU utilization and network traffic). The resource management module (100) also forwards the current price for the service to a user (or user device) in response to the request received. Further, in one or more embodiments of the present invention, the resource management module (100) forwards prices for the service if the user chose to use the service at alternative times. These estimated prices are based on empirical use data for the system for the same period of time over several years.

If the user chooses to proceed with a desired transaction at the current price, then data is transmitted from the user (e.g., User 1 (108), User 2 (110), and User 3 (112)) to the resource infrastructure (134) and the service is provided. For certain services, such as an online tax filing service, the data is processed within the resource infrastructure (134) and, eventually, transmitted to a destination server (Destination Server 1 (122), Destination Server 2 (124)). In one or more embodiments of the invention, Destination Server 1 (122) is connected to the resource infrastructure (134) via the Internet (118) or other WAN. In another embodiment of the present invention, Destination Server 2 (124) is connected to the resource infrastructure (134) via a dedicated communication link or channel. In the online tax filing example, Destination Server 1 (122) and Destination Server 2 (124) are servers controlled by the Internal Revenue Service and configured to receive electronic tax returns.

One skilled in the art will appreciate that firewalls (126, 128, 130, 132) may be located throughout the system shown in FIG. 1 to protect the various components from being compromised because sensitive data (e.g., personal identification information, credit card numbers, salary, etc.) is being stored. Further, the communication lines and channels shown may be protected using technique or schemes well-known in the art, such as encoding, encrypting, etc. However, the system could remain functioning without one or more of the firewalls (126, 128, 130, 132) and without using any protection techniques or schemes.

Figure 2:
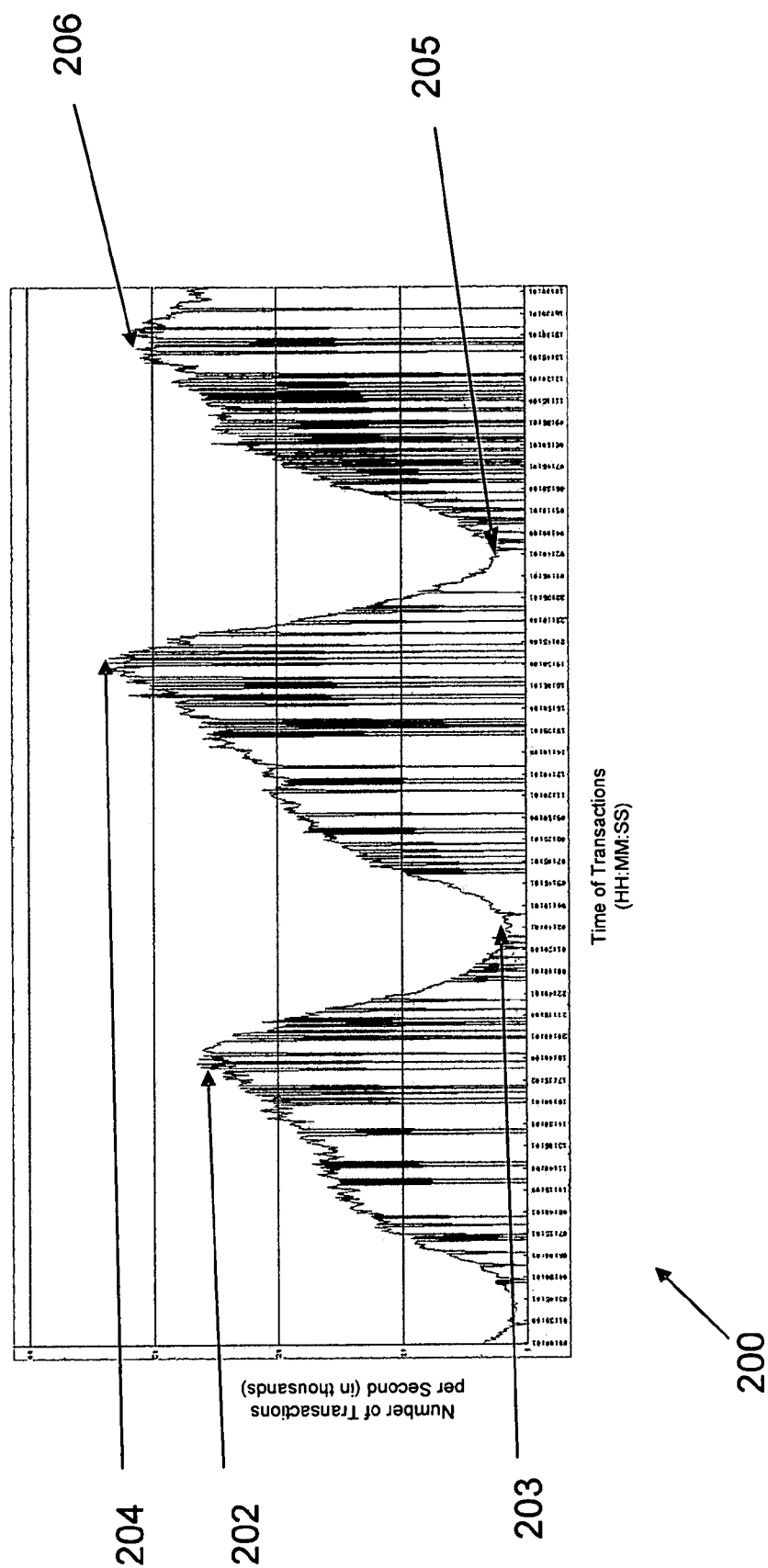
FIG. 2 shows a graphical data representation, in accordance with one or more embodiments of the invention.

FIG. 2 shows a graphical data representation in accordance with one or more embodiments of the invention. The graphical data representation (200) shows network traffic for an online service over a multiple day period. Specifically, the graph indicates the number of online transaction requests received by hour over approximately a three day period. For the purpose of FIG. 2, the time of the transactions is shown in hours, minutes, and seconds. The number of transactions per second is shown per thousand, with indicators at each 10,000 transactions.

The graphical data representation (200) shown in FIG. 2 clearly shows a system with a cyclical peaks (202, 204, 206) and idle times (203, 205). These cyclical peaks (202, 204, 206) and idle times (203, 205) for the system are determined by monitoring the system utilization while receiving various transactions. By observing the graphical data representation (200), the average number of transactions per second (TPS) during the three day period may be determined. Predictably, the graphical data representation (200) shows that the peak number of transactions tends to occur in late afternoon-early evening time period each day, while the idle period seems to occur around the midnight-early morning hours.

Based on these observations, a variable pricing model could be used in an attempt to even out the resource demand and effectively avoid additional capital expenditures for equipment only used during the peak demand hours. For example, in the online tax filing industry, the present invention could motivate users to submit tax filings during non-peak hours by providing the user with both the current price (based on real-time system utilization) and future prices for alternative times (based on empirical data). If the request associated with the tax filing submission is submitted during the peak hours, then the displayed current price is listed at a rate significantly higher than the displayed rate for alternative times. Accordingly, a significant number of users might decide to forgo immediately submitting the tax filing during non-peak hours, effectively leveling differences between peak-hour submissions and non-peak hour submission. The leveling of RPS curtails IT infrastructure investment which otherwise would have been necessary without one or more embodiments of the present invention.

Figure 3:
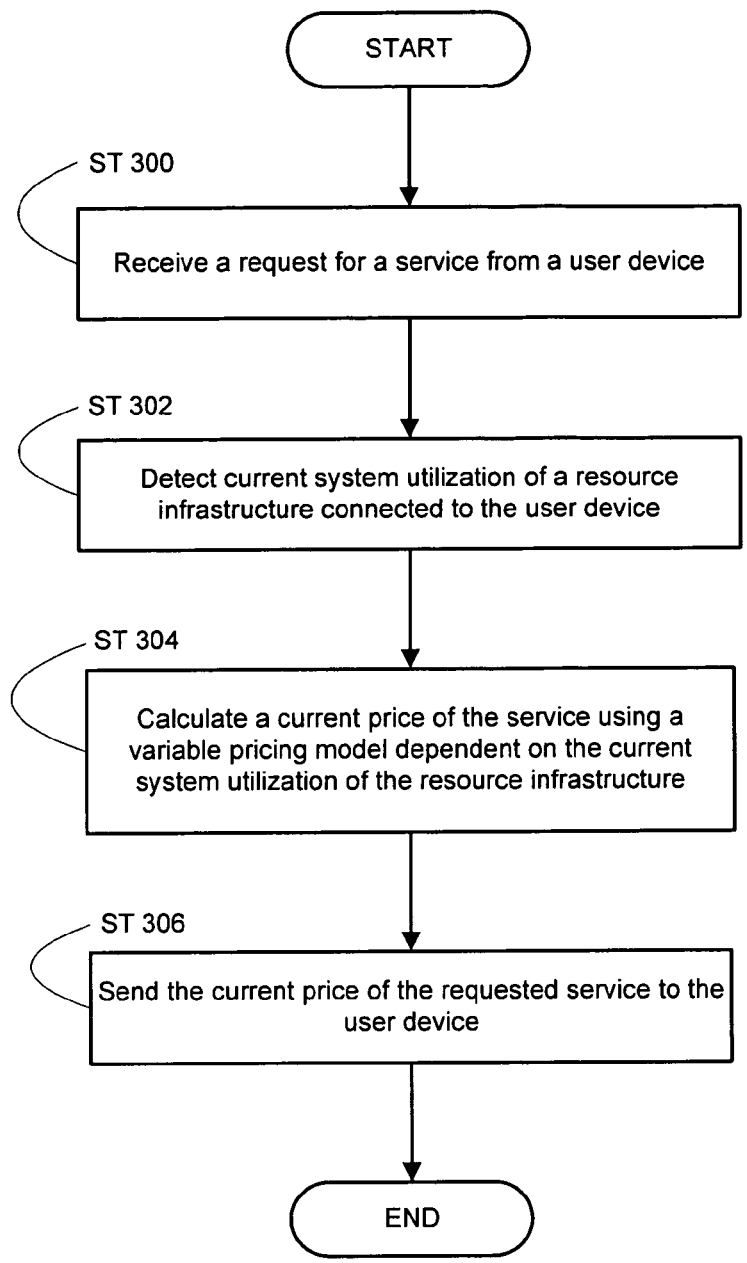
FIGS. 3-4 show flow charts for a variable pricing model, in accordance with one or more embodiments of the invention.

FIG. 3 shows a flowchart in accordance with one or more embodiments of the invention. In ST 300, a resource infrastructure of a service provider receives a request from a user device. In one or more embodiments of the invention, this request is a price request for a service, such as a current price request or an estimated future price request. In ST 302, current system utilization of the resource infrastructure is monitored and detected. In one or more embodiments of the invention, a resource management module, which is connected to the resource infrastructure detects the current system utilization. Further, as discussed above, the current system utilization may be composed of only one measure (i.e., CPU utilization or network traffic load) or a combination of several measures, where one or more of the measures may be weighted according to a formula.

In ST 304, a current price of the service using a variable pricing model is calculated dependent on the current system utilization of the resource infrastructure. In one or more embodiments of the invention, the resource management module calculates the current price of the service using the variable pricing model. Accordingly, the calculated current price is substantially higher than a historical average price when the level of current system utilization is high. Conversely, the calculated current price is substantially lower than a historical average price when the level of current system utilization is low. However, one skilled in the art will appreciate that the variable pricing model has an upper bound and a lower bound for the calculated current price. For example, the upper bound may be limited to the highest price charged by a competitor for the service and the lower bound may be limited by the "break even" cost or the fixed cost (i.e., the sum of all costs required to provide the first unit of service) of providing the service.

In ST 306, the current price of the service is provided to the user device. In one or more embodiments of the invention, resource infrastructure sends the current price. One skilled in the art will appreciate that the current price of the service may be displayed in any unit or any type of currency to match the customs and practices of the particular service and/or the country where the service is offered.

Figure 4:
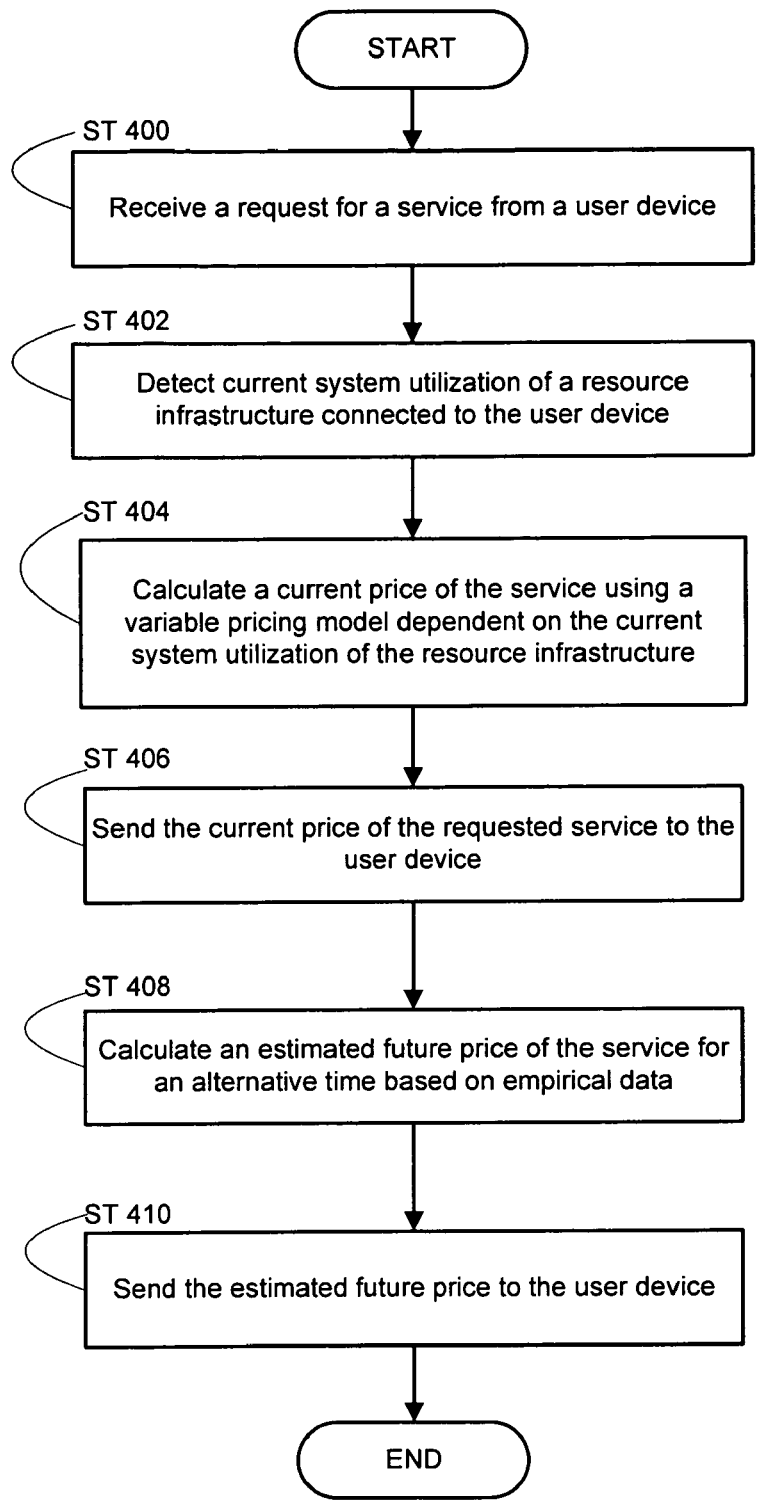

FIG. 4 shows a flowchart in accordance with one or more embodiments of the invention. In ST 400, a resource infrastructure of a service provider receives a request for a service from a user device in a manner similar to that described above with regards to ST 300 of FIG. 3. In ST 402, current system utilization of the resource infrastructure is monitored and detected in a manner similar to that described above with regards to ST 302 of FIG. 3. In ST 404, a current price of the service using a variable pricing model dependent on the current system utilization of the resource infrastructure is calculated in a manner similar to that described above with regards to ST 304 of FIG. 3. In ST 406, the current price of the service is sent to the user device in a manner similar to that described above with regards to ST 306 of FIG. 3.

In ST 408, one or more estimated future price(s) of the service are calculated for an alternative time(s) based on historical system utilization of the resource infrastructure at various times (i.e., empirical data). In one or more embodiments of the invention, the resource management module calculates the estimated future price(s). In ST 410, the estimated future price(s) are sent to the user device. In one or more embodiments of the invention, resource infrastructure sends the estimated future price(s). One skilled in the art will appreciate that the estimated future price(s) of the service may be displayed in any unit or any type of currency to match the customs and practices of the particular service and/or the country where the service is offered. Further, one skilled in the art will appreciate that the current price and the estimated future price(s) may be sent to the user device together (as a single step/transaction) and displayed as various service options for the user.

At some point, the user either selects a service with an associated price for the service (based on the current system utilization) or decides to wait until another time to use the service when the cost of the service is more affordable (based on estimated future price(s)). By providing the current price of the service as well as one or more estimated future prices to the user device, the service provider encourages the user to use the service when the price is low. Since lower prices are associated with lower system utilizations at a given time, the service provider can level the difference in transaction traffic between peak-hours and non-peak hours and achieve significant cost savings in IT infrastructure investment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for applying a variable pricing model for a service comprising:
    a processing server of a service provider within a resource infrastructure, wherein the processing server is configured to:
        receive a first request for the service from a user computing device,
        receive a second request for the service from the user computing device at an alternative time, and
        receive a selection of the service at an updated price from the user computing device; and
    a resource management module associated with the resource infrastructure and the processing server, wherein the resource management module is configured to:
        detect current central processing unit (CPU) utilization of the resource infrastructure connected to the user computing device,
        calculate a current price of the service based on current CPU utilization exceeding a threshold value,
        calculate an estimated future price of the service for the alternative time based on empirical data of CPU utilization,
        forward the current price and the estimated future price to the user computing device requesting the service,
        calculate the updated price of the service based on CPU utilization at the alternative time exceeding a second threshold value, and
        forward the updated price to the user computing device requesting the service.

2. The apparatus of claim 1, wherein the first request for the service by the user computing device comprises a current price request and an estimated future price request.

3. The apparatus of claim 1, wherein the user computing device sends a purchase decision to the processing server responsive to the current price.

4. The apparatus of claim 1, wherein the service is an electronic tax filing service.

5. The apparatus of claim 4, further comprising:
a second processing server within the resource infrastructure, wherein the second processing server is configured to send a tax return to a destination server.

6. The apparatus of claim 1, wherein the current system price is calculated prior to receiving the first request from the user computing device.

7. A method for applying a variable pricing model for a service comprising:
receiving a first request for the service from a user computing device;
detecting, using a computer system implemented with a physical computer processor, current central processing unit (CPU) utilization of a processing server of a service provider of the service, the processing server operatively connected to the user computing device;
calculating, using the computer system, a current price of the service based on the variable pricing model and the first request, wherein the variable pricing model obtains the current price based on the current CPU utilization exceeding a first threshold value;
calculating, using the computer system, an estimated future price of the service for an alternative time based on empirical data of CPU utilization;
forwarding the current price and the estimated future price to the user computing device requesting the service;
at the alternative time, receiving a second request for the service from the user computing device;
calculating, using the computer system, an updated price of the service based on the variable pricing model and the second request, wherein the variable pricing model obtains the updated price based on CPU utilization at the alternative time exceeding a second threshold value;
forwarding the updated price to the user computing device requesting the service; and
receiving a selection of the service at the updated price from the user computing device.

8. The method of claim 7, further comprising:
receiving a purchase decision for the service from the user computing device responsive to the current price.

9. The method of claim 8, wherein the service is an electronic tax filing service.

10. The method of claim 9, further comprising:
processing the request for the service from the user computing device by sending an electronic tax return from the electronic tax filing service to a destination server.

11. The method of claim 7, wherein the current system price is calculated prior to receiving the first request from the user computing device.

12. The method of claim 7, wherein the first request for the service by the user computing device comprises a current price request and an estimated future price request.

13. An apparatus for applying a variable pricing model for an electronic tax filing service comprising:
a user computing device configured to:
send a first request for the electronic tax filing service, and
send a second request for the electronic tax filing service at an alternative time;
a processing server of a service provider within a resource infrastructure, wherein the processing server is configured to:
receive the first request from the user computing device,
receive the second request from the user computing device at the alternative time, and
receive a selection of the tax filing service at an updated price from the user computing device; and
a resource management module associated with the resource infrastructure, wherein the resource management module is configured to:
detect current central processing unit (CPU) utilization of the resource infrastructure connected to the user computing device,
calculate a current price of the tax filing service when based on current CPU utilization exceeding a threshold value,
calculate an estimated future price of the tax filing service for the alternative time based on empirical data of CPU utilization,
forward the current price and the estimated future price to the user computing device requesting the electronic tax filing service,
calculate the updated price of the tax filing service based on CPU utilization at the alternative time exceeding a second threshold value, and
forward the updated price to the user computing device requesting the tax filing service.

14. The apparatus of claim 13, wherein the first request for the electronic tax filing service comprises a current price request and an estimated future price request.

15. The apparatus of claim 13, wherein the user computing device sends a purchase decision to the processing server responsive to the current price.

16. The apparatus of claim 15, further comprising:
a second processing server within the resource infrastructure, wherein the second processing server is configured to send a tax return from the electronic filing service to a destination server.

17. The apparatus of claim 13, wherein the current system price is calculated prior to receiving the first request from the user computing device.

* * * * *